US010782145B2

(12) United States Patent
Diaz et al.

(10) Patent No.: US 10,782,145 B2
(45) Date of Patent: Sep. 22, 2020

(54) DEVICES AND METHODS FOR DETERMINING A DISTANCE TRAVELLED

(71) Applicant: GM GLOBAL TECHNOLOGY OPERATIONS LLC, Detroit, MI (US)

(72) Inventors: Michael G. Diaz, Ann Arbor, MI (US); Adam J. Heisel, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 318 days.

(21) Appl. No.: 15/441,829

(22) Filed: Feb. 24, 2017

(65) Prior Publication Data
US 2018/0245945 A1 Aug. 30, 2018

(51) Int. Cl.
G01C 22/02 (2006.01)
B60K 1/00 (2006.01)
B60K 17/12 (2006.01)
B60L 3/12 (2006.01)
G01D 5/20 (2006.01)

(52) U.S. Cl.
CPC ............... G01C 22/02 (2013.01); B60K 1/00 (2013.01); B60K 17/12 (2013.01); B60L 3/12 (2013.01); G01D 5/2006 (2013.01); B60K 2001/001 (2013.01); B60L 2240/421 (2013.01); B60Y 2400/303 (2013.01); B60Y 2400/3084 (2013.01)

(58) Field of Classification Search
None
See application file for complete search history.

(56) References Cited

U.S. PATENT DOCUMENTS

| 4,498,438 | A | * | 2/1985 | Sato | F02P 5/1504 123/406.63 |
| 6,107,761 | A | * | 8/2000 | Seto | B60K 1/02 180/179 |
| 6,483,197 | B1 | * | 11/2002 | Masberg | B60K 6/26 290/40 C |
| 2007/0037626 | A1 | * | 2/2007 | Yamazaki | F16D 3/223 464/111 |
| 2011/0308331 | A1 | * | 12/2011 | Bodin | G01L 3/109 73/862.193 |
| 2014/0142836 | A1 | * | 5/2014 | Yabuta | B60W 10/06 701/123 |
| 2016/0236589 | A1 | * | 8/2016 | Sikand | B60K 17/356 |

FOREIGN PATENT DOCUMENTS

GB 2055487 A * 3/1981 ............. G01C 22/02

* cited by examiner

Primary Examiner — Paresh Patel
(74) Attorney, Agent, or Firm — Lorenz & Kopf, LLP

(57) ABSTRACT

Vehicles, systems, and methods for determining a distance travelled are provided. In an exemplary embodiment, a vehicle includes an electric motor with a motor rotor shaft. A motor resolver is positioned adjacent to the motor rotor shaft, where the motor resolver is configured to determine a motor position of the electric motor based on revolutions of the motor rotor shaft. A controller is in communication with the motor resolver, where the controller is configured to determine a distance travelled from a change in the electric motor position.

14 Claims, 2 Drawing Sheets

DEVICES AND METHODS FOR DETERMINING A DISTANCE TRAVELLED

INTRODUCTION

The present invention generally relates to components for determining a distance travelled, and methods for determining the distance travelled. More particularly, the present invention relates to vehicles with components to determine the distance travelled by determining a change in position of an electric drive motor for the vehicle, and methods for the same.

Autonomous driving for vehicles is an emerging technology with the potential to increase convenience and safety for vehicle occupants. As with a human driver, autonomous driving uses various types of information for the driving process. Examples of the information used in autonomous driving include determinations of current position of the vehicle (localizing), determinations of a distance travelled, determinations of a direction travelled, determinations of the position of objects outside of the vehicle, etc. The current position of a vehicle can be determined based on known reference points. In one example, a stop sign at a given intersection serves as a reference point with a known location. The position of the vehicle relative to the stop sign is determined by one or more of a variety of techniques, such as Light Detection and Ranging (LIDAR) or radar. Other techniques are used in addition to, or in place of, the exemplary LIDAR technique described above, such as Global Positioning Systems (GPS) or others. A compass is used to determine the direction of travel from a known position (a localized position) in some embodiments, and radar, sonar, or other techniques are optionally used for detecting the presence and position of objects outside of the vehicle.

In an exemplary embodiment, a vehicle parked at a stop sign is localized with a known position, but the vehicle "creeps" forward to determine if there is oncoming traffic. It is desirable for the autonomous driving system to accurately determines the relatively short distance travelled while creeping forward to accurately track the current position of the vehicle. In some embodiments, the vehicle position relative to a known reference point is not obtained for small changes such when creeping forward, so a "dead reckoning" system that determines distance travelled and the direction of travel is useful. A compass is used for the direction of travel in one example.

Accordingly, it is desirable to develop methods and systems to accurately determine a distance travelled. In addition, it is desirable to develop vehicles that utilize inexpensive and reliable components with a proven track record for determining the distance travelled, and methods for doing the same. Furthermore, other desirable features and characteristics of the present invention will become apparent from the subsequent detailed description of the invention and the appended claims, taken in conjunction with the accompanying drawings and the background of the invention.

SUMMARY

Vehicles, systems, and methods for determining a distance travelled are provided. In an exemplary embodiment a vehicle includes an electric motor with a motor rotor shaft. A motor resolver is positioned adjacent to the motor rotor shaft, where the motor resolver is configured to determine a motor position of the electric motor based on revolutions of the motor rotor shaft. A controller is in communication with the motor resolver, where the controller is configured to determine a distance travelled from a change in the electric motor position.

A system for determining a distance travelled is provided in another embodiment. The system includes an electric motor with a motor rotor shaft, a drive wheel, and a drive train connecting the electric motor to the drive wheel. A motor resolver is positioned adjacent to the motor rotor shaft, where the motor resolver is configured to determine a motor position of the electric motor based on motion of the motor rotor shaft. A controller is in communication with the motor resolver, and the controller is configured to determine a number of rotations of the drive wheel relative to a change in the electric motor position.

A method of determining a distance travelled is provided in yet another embodiment. The method includes determining a first position and a second position of an electric motor, where the electric motor is connected to a drive wheel by a drive train. A change in electric motor position is determined from the first and second positions, and the distance travelled is determined by a set ratio of the change in electric motor position to the distance travelled.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
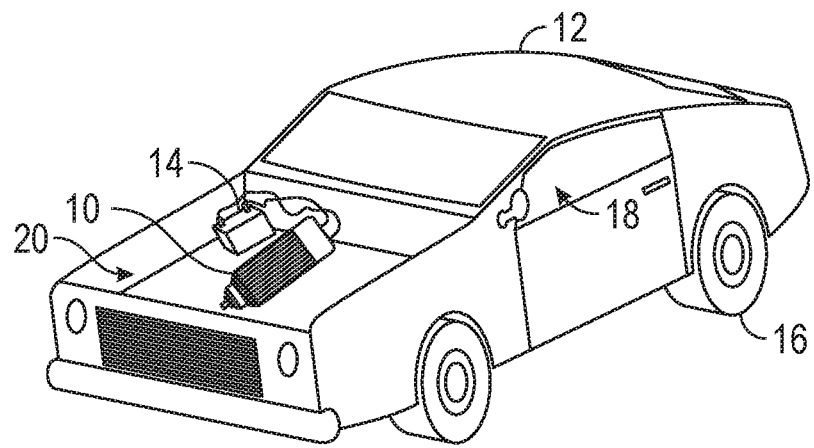
FIG. 1 illustrates an exemplary vehicle.

In an exemplary embodiment, an electric motor 10 is mounted within the body of a vehicle 12, as illustrated in FIG. 1. The electric motor 10 includes a motor rotor shaft 8 that rotates as the electrical power is converted to mechanical power. As such, the position or rotations of the electric motor 10 is evident at the motor rotor shaft 8. The vehicle 12 is an automobile in an exemplary embodiment, but in alternate embodiments the vehicle 12 is a tractor, a train, a boat, an airplane, or other types of vehicles in alternate embodiments. In an exemplary embodiment, the vehicle 12 includes one or more batteries 14 for powering the electric motor 12, but other sources of electric power are also possible. For example, a fuel cell or an internal combustion engine connected to a generator provides electricity in alternate embodiments. The vehicle 12 includes a drive wheel 16 in an exemplary embodiment, but there are two, three, four, six, or other numbers of drive wheels 16 in alternate embodiments. The exemplary automobile vehicle 12 includes a passenger compartment 18, an engine compartment 20, automated and/or manual operating devices (not illustrated) such as a steering wheel, a brake, a throttle, etc., and other components typically present in an automobile. However, other embodiments are also possible.

Figure 2:
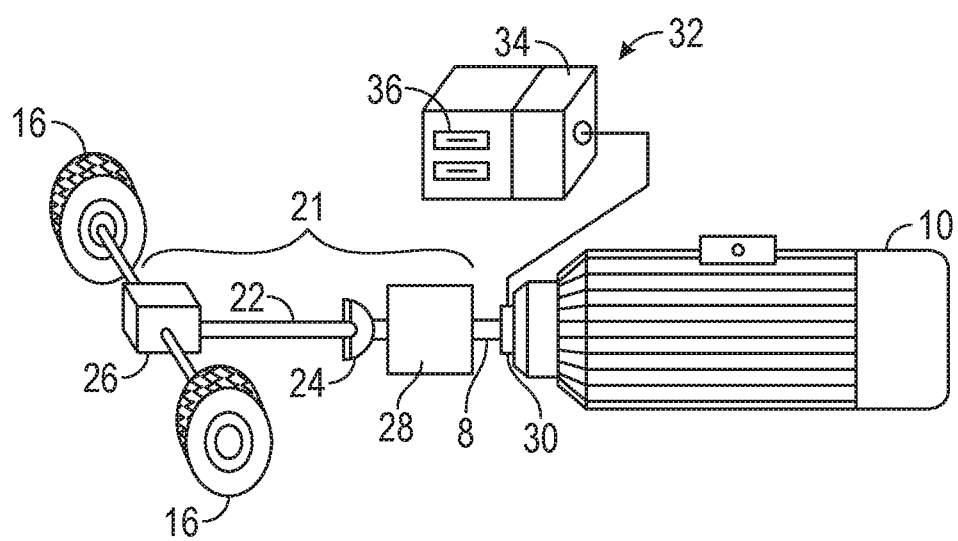
FIG. 2 illustrates components of an exemplary vehicle.

Reference is made to the exemplary embodiment illustrated in FIG. 2, with continuing reference to FIG. 1. The electric motor 10 is coupled to the drive wheel(s) 16, and the coupling is mechanical in many embodiments. A drive train 21 couples the electric motor 10 to the drive wheel(s) 16, and in an example the drive train 21 includes a drive shaft 22, a U bolt 24, a differential 26, a transmission 28, and other optional components. The coupling of the electric motor 10 to the drive wheel 16 allows for transfer of power from the electric motor 10 to the drive wheel 16. The electric motor 10 is directly coupled to the drive shaft 22, such that the drive shaft 22 rotates in direct proportion to rotations of the electric motor 10.

A motor resolver 30 is positioned adjacent to the motor rotor shaft 8 of the electric motor 10, where the motor resolver 30 is configured to detect motion of the motor rotor shaft 8. In an exemplary embodiment, the motor resolver 30 is directly mounted to a body of the electric motor 10 and positioned concentrically around the motor rotor shaft 8, but other configurations are possible. In an exemplary embodiment, the motion of the motor rotor shaft 8 that is detected by the motor resolver 30 is revolutions. The motor rotor shaft 8 is part of the electric engine 10, and the motor resolver 30 is configured to determine a motor position of the electric motor 10 based on motion of the motor rotor shaft 8. The motor resolver 30 determines a first motor position at a first time and a second motor position at a second time, where the difference between the second and first motor positions is a change in the electric motor position. The motor resolver 30 detects fractions of a revolution in some embodiments, where the motor resolver 30 determines the motor position more accurately than simply a whole number total of revolutions.

The electric motor 10 is connected to the drive wheel 16, so the rotations of the electric motor 10 are directly proportional to the rotations of the drive wheel 16. The drive wheel 16 propels the vehicle 12, so the rotations of the drive wheel 16 are proportional to the distance travelled by the vehicle. As such, the change in position (i.e., the rotations) of the electric motor 10 is proportional to the distance travelled, and the rotations of the electric motor 10 and the distance travelled are proportional to the rotations of the drive wheel 16. The distance travelled is related to the change in position of the electric motor 10 by a set ratio, so the change in position of the electric motor 10 times the set ratio provides an estimate of the distance travelled. Multiplying the change in position of the electric motor 10 by a different ratio provides the rotations of the drive wheel 16. As such, multiplying the rotations of the drive wheel 16 by yet another ratio provides an estimate of the distance travelled. In an exemplary embodiment, the distance travelled is used in an autonomous driving system or for other purposes.

A controller 32 is in communication with the motor resolver 30, and the controller 32 is utilized for several different functions within the vehicle 12 in some embodiments. In an exemplary embodiment, the controller 32 is dedicated to determining the distance travelled by the vehicle 12. The controller 32 includes any combination of hardware and software configured to determine the distance travelled from the change in the electric motor position. In various embodiments the controller 32 includes any type of processor 34 or multiple processors 34, integrated circuits such as a microprocessor, or any suitable number of integrated circuit devices and/or circuitry working in cooperation to accomplish the tasks of the controller 32. The controller 32 executes one or more programs that are be stored within a controller memory 36 in an exemplary embodiment. In one example, the controller memory 36 saves various other data as well, such as the ratio of the change in the electric motor position to the distance travelled. In various embodiments, the controller 32 includes, or has access to, any type of controller memory 36, including but not limited to random access memory (RAM), read only memory (ROM), erasable programmable read only memory (EPROM), electrically erasable programmable read only memory (EEPROM), and non-volatile random access memory (NVRAM).

Figure 3:
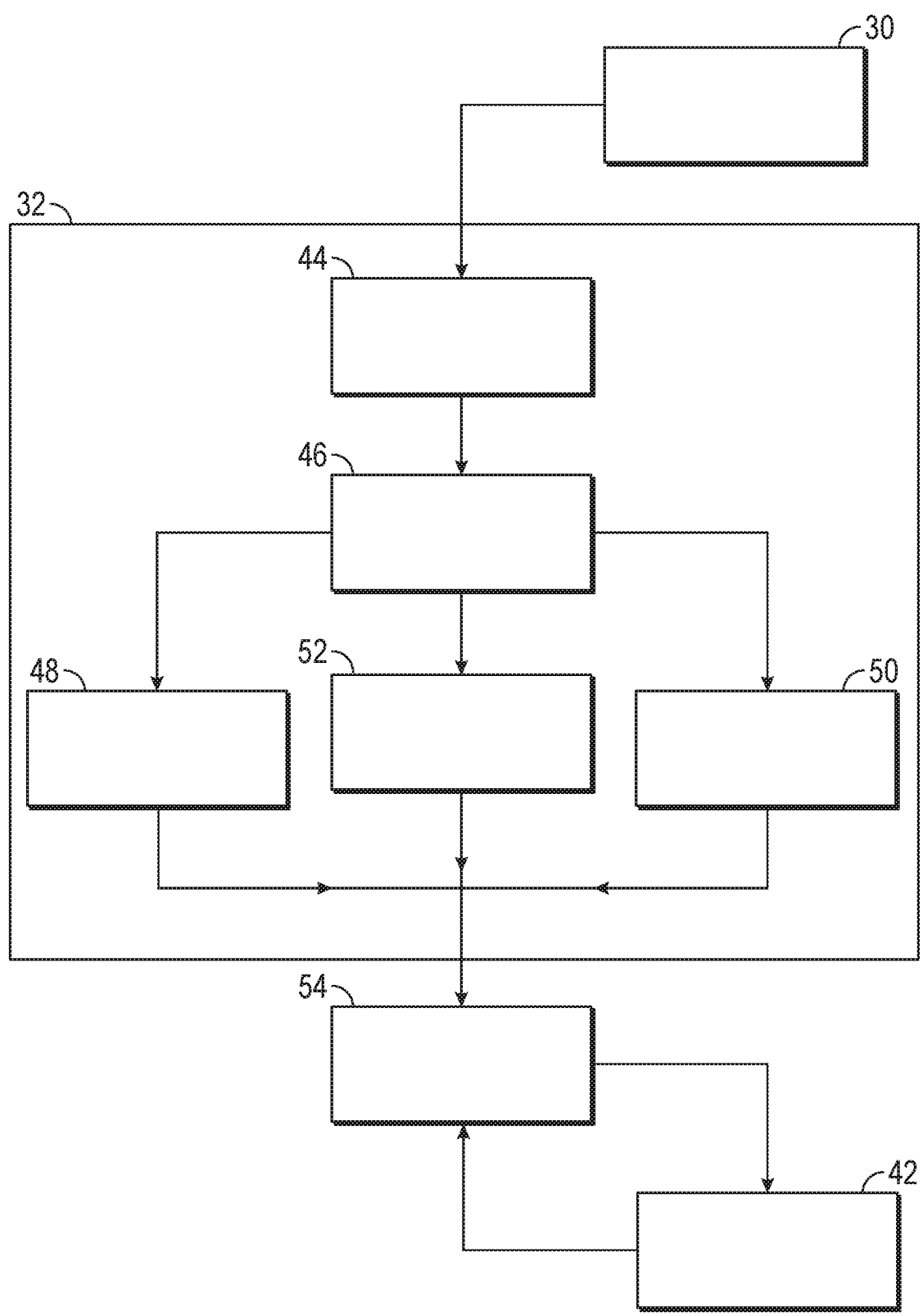
FIG. 3 is a process schematic of an exemplary technique of determining a distance travelled.

An exemplary embodiment of the process for determining the distance travelled is illustrated in FIG. 3, with continuing reference to FIGS. 1 and 2. The motor resolver 30 provides motor position information to the controller 32, where the motor position information includes the first motor position and the second motor position described above in an exemplary embodiment. In one example, the motor resolver 30 then provides a third motor position, a fourth motor position, etc., but in another embodiment the motor resolver 30 is reset when the distance travelled 42 is determined so what was the second motor position is reset to the first motor position, and so on. In any event, the motor resolver 30 provides motor position information to the controller such that a change in the electric motor position 44 can be determined. In an exemplary embodiment, the controller 32 determines the change in the electric motor position 44, but in alternate embodiments the motor resolver 30 determines the change in the electric motor position 44 and transfers a signal to the controller 32 with that change in the electric motor position 44. In one example, the controller 32 is reset by a localization event (not illustrated), where the position of the vehicle 12 is determined from an outside reference point in the localization event.

The system and method described above can determine the distance travelled 42 by a vehicle 12 based on the change in an electric motor position 44. However, there are variables that can influence the accuracy of the estimated distance travelled 42, and the controller 32 is optionally configured to compensate for one or more of these variables. For example, gear lash influences the estimate of the distance travelled 42. Gear lash results from a clearance in mating gear teeth. When the direction of applied force is changed, the teeth in the gears will travel through the clearance area without applying force in an opposite direction. For example, if the vehicle 12 is moving forward and then comes to rest, the teeth of gears that are present in the transmission 28, the differential 26, and/or any other gears in the connection between the electric motor 10 and the drive wheel 16 remain in contact for the forward direction. If the vehicle 12 is then driven in reverse, the teeth of the gears will pass through the clearance space before the electric motor 10 provides a reverse drive force to the drive wheel 16. As such, the position of the electric motor 10 will change and the vehicle 12 will not travel any distance until the clearance from the gear lash is traversed.

The electric motor 10 provides a torque to the drive train 21 that is transferred to the drive wheel 16, and this torque is be related to the electrical current provided to the electric motor 10 in an exemplary embodiment. In one example, the controller 12 determines a drive train torque 46 based on the current provided to the electric motor 10, where the drive train torque 46 is calculated with a straight line relation, a polynomial relation, a look-up table, or by other techniques in various embodiments. In one embodiment, current sensors (not illustrated) provide the current supplied to the electric motor 10. When the vehicle 12 changes direction and gear lash influences the accuracy of the estimated distance travelled 42, the drive train torque 46 crosses a zero value such that the drive train torque 46 changes from a positive value to a negative value, or from a negative value to a positive value. Therefore, in the example described above, the controller 32 reduces the estimated distance travelled 42 by a gear lash distance 48 when the drive train torque 46 crosses a zero value. The gear lash distance 48 is calculated based on the design for gears in the drive train 21, measurements of the gears in the drive train 21, comparison of information provided by the motor resolver 30 with speed sensors (not illustrated) further down the drivetrain 21 (such as a speed sensor at the differential 26), or by experimentation. As such, in the example described above the controller 32 adjusts the estimated distance 42 travelled by the gear lash distance 48. The gear lash distance 48 is about constant because it results from gear teeth clearance, so the size of the gear lash distance 48 is not dependent on the drive train torque 46. The controller 32 determines when to include the gear lash distance 48 in the estimate of the distance travelled 42 based on the drive train torque 46, but the controller generally does not change the length of the gear lash distance 48 based on the amount of drive train torque 46.

Drive train twist also influences the accuracy of the estimated distance travelled 42. When the electric motor 12 engages, the drive train torque 46 causes some drive train twist, where components of the drive train 21 deform from the drive train torque 46. The drive shaft 22 is the component of the drive train 21 that experiences the most twist with the drive train torque 46 in some embodiments. In many embodiments, the drive train twist is about elastic, so the drive train 21 returns to about its original shape when the drive train torque 46 is removed. As the drive train 21 twists, some of the change in the electric motor position 44 is transferred to the twisting motion of the drive train 21, and that change in the electric motor position 44 does not move the drive wheel 16 and increase the distance travelled 42. The reduced distance travelled 42 relative to the change in the electric motor position 44 is referred to herein as the drive train twist distance 50. The controller 32 optionally adjusts the estimate of the distance travelled 42 to compensate for the drive train twist distance 50. The drive train twist distance 50 increases as the drive train torque 46 increases, so in an exemplary embodiment the drive train twist distance 50 is determined based on the quantity of the drive train torque 46. The drive train twist distance 50 increases the distance travelled as the drive train torque 46 reduces, because the drive train un-twists as the drive train torque 46 decreases. The relationship between the drive train torque 46 and the drive train twist distance 50 is determined by mathematical models, experimentation, or other methods. The controller 32 uses a linear relationship, a polynomial relationship, look up tables, or other techniques to determine the drive train twist distance 50 from the drive train torque 46.

In some embodiments, the drive train twist distance 50 at the absolute value of a set drive train torque 46 is different in the forward and reverse directions, because the drive train 21 twists to a different degree depending on the direction of the drive train torque 46. Therefore, the controller 32 is optionally configured to determine a forward drive train twist distance and a backwards drive train twist distance, where the absolute values of the forward and backwards drive train twist distances are different at a set absolute value of the drive train torque 46. i.e., the drive train torque 46 in the forward and backwards direction are the same, except one is a positive value and the other is a negative value, and the absolute value of the distance travelled 42 is different in the forward and backwards directions.

There is a time delay between when the motor resolver 10 sends a signal with the motor position and when that signal is received by the controller 32, and this delay influences the accuracy of the estimated distance travelled 42. This time delay in the signal is referred to herein as the signal delay. The controller 32 optionally adjusts the estimate of the distance travelled 42 to compensate for the signal delay. In an exemplary embodiment, the controller 32 increases the estimate of the distance travelled 42 to compensate for the signal delay by multiplying a most recently calculated speed of travel (not illustrated) by the time of the signal delay to obtain a signal delay distance 52. The signal delay distance 52 is then added to the estimate of the distance travelled 42. The speed of travel is the distance travelled 42 divided by the time of that travel, so the speed of travel is determined by the controller 32. In an alternate embodiment, the signal delay distance 52 is estimated with a multiplier applied to the drive train torque 46 because the speed of travel is related to the drive train torque 46 (with higher drive train torques 46 producing higher speeds of travel.) The relationship between the signal delay distance 52 and the drive train torque 46 is determined with models or by experimentation. The controller 32 uses a linear model, a polynomial model, a look up table, or other techniques to determine the signal delay distance 52 from the drive train torque 46. Signal delays are predictable, so the model can utilize known controller sample and loop rates to predict and compensate for the signal delay.

The relationship between the distance travelled 42 and the change in the electric motor position 44 is related to a drive wheel radius 54, where the drive wheel radius 54 is the radius of the drive wheel 16. The drive wheel radius 54 changes due to wear and tear, temperature, level of inflation, or other factors, and the change in the drive wheel radius 54 alters the distance travelled 42 relative to the change in the electric motor position 44. In an optional exemplary embodiment, the controller 32 includes the drive wheel radius 54 in the determination of the estimate of the distance travelled 42. As mentioned above, the vehicle 12 is periodically localized relative to a fixed external object in some embodiments. The distance between two localization events is known. In an exemplary embodiment, the controller 32 totals the estimated distance travelled 42 between the two localization events and compares that total to the known distance between the two localization events. The controller 32 then adjusts the drive wheel radius 54 used in the determination of the distance travelled 42 such that the estimate of the distance travelled 42 matches the known distance between the two localization events. In various embodiments, the controller 32 uses an average for more than one set of known distances between localization events in determining the drive wheel radius 54, or the controller 32 uses "rules" before updating the drive wheel radius 54. For example, before changing the estimated drive wheel radius 54, the controller 32 requires repeated differences of the same type (such as repeated negative or positive differences) between the estimated drive wheel radius 54 and the drive wheel radius 54 calculated based on the known distance between localization events.

The estimate of the distance travelled 42 is optionally used for autonomous driving purposes, but it is also optionally used for navigation or maintenance purposes. For example, if the estimated drive wheel radius 54 falls below a set value, the controller 32 sends a notice to a vehicle occupant or owner that new tires are recommended. Several adjustments to the estimate of the distance travelled 42 have been described above, but it is understood that other factors also influence distance travelled 42 and these are optionally incorporated into the controller 32 to improve accuracy in various embodiments.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration of the invention in any way. Rather, the foregoing detailed description will provide those skilled in the art with a convenient road map for implementing an exemplary aspect of the invention. It being understood that various changes may be made in the function and arrangement of elements described in an exemplary aspect without departing from the scope of the invention as set forth in the appended claims.

What is claimed is:

1. A vehicle comprising:
   an electric motor, wherein the electric motor comprises a motor rotor shaft;
   a motor resolver positioned adjacent to the motor rotor shaft, wherein the motor resolver is configured to determine rotations of the motor rotor shaft, wherein the motor resolver is configured to determine a change in the motor rotor shaft position from a first time to a second time;
   a drive train coupled to the motor rotor shaft;
   a drive wheel coupled to the drive train such that rotations of the motor rotor shaft are proportional to rotations of the drive wheel, wherein the drive wheel propels the vehicle; and
   a controller in communication with the motor resolver, wherein the controller is configured to determine a distance travelled by the vehicle from the change in the motor rotor shaft position, and wherein the controller is further configured to determine a drive train torque, and to adjust the distance travelled by a gear lash distance when the drive train torque crosses a zero value.

2. The vehicle of claim 1, wherein the gear lash distance is determined based on a design of the drive train or by experimentation.

3. The vehicle of claim 1 wherein the controller is configured to determine a number of rotations of the drive wheel.

4. The vehicle of claim 1 wherein the controller is configured to:
   determine a drive train twist distance based on the drive train torque, wherein the drive train twist distance is determined by a mathematical model or by experimentation; and
   adjust the distance travelled by the drive train twist distance.

5. The vehicle of claim 4 wherein the controller is configured to determine a current for the electric motor, and wherein the controller is configured to determine the drive train torque based on the current for the electric motor.

6. The vehicle of claim 1 wherein the controller is configured to:
   determine a drive wheel radius; and
   utilize the drive wheel radius to determine the distance travelled.

7. The vehicle of claim 1 wherein the controller is configured to adjust the distance travelled with a signal delay distance, wherein the signal delay distance depends on a time delay of a signal from the motor resolver to the controller.

8. A system for determining a distance travelled comprising:
   an electric motor comprising a motor rotor shaft;
   a drive wheel;
   a drive train connecting the motor rotor shaft to the drive wheel;
   a motor resolver positioned adjacent to the motor rotor shaft, wherein the motor resolver is configured to determine rotations of the motor rotor shaft, wherein the motor resolver is configured to determine a change in the motor rotor shaft position from a first time to a second time; and
   a controller in communication with the motor resolver, wherein the controller is configured to determine a number of rotations of the drive wheel relative to the change in the motor rotor shaft position, and wherein the controller is further configured to determine a drive train torque, and to adjust the number of rotations of the drive wheel by a gear lash distance when the drive train torque crosses a zero value.

9. The system of claim 8 wherein the controller is further configured to:
   determine a distance travelled by a vehicle from the number of rotations of the drive wheel, wherein the drive wheel propels the vehicle;
   determine a current to the electric motor; and
   determine the drive train torque from the current to the drive train.

10. The system of claim 9 wherein the controller is further configured to:
    determine a drive train twist distance from the drive train torque, wherein the drive train twist distance is determined by a mathematical model or by experimentation; and
    adjust the distance travelled by the drive train twist distance.

11. A method of determining a distance travelled by a vehicle comprising:
    determining rotations of a motor rotor shaft using a motor resolver positioned adjacent to the motor rotor shaft, wherein the motor rotor shaft is a portion of an electric motor, wherein a drive train is coupled to the motor rotor shaft, a drive wheel is coupled to the drive train such that rotations of the motor rotor shaft are proportional to rotations of the drive wheel, and wherein the drive wheel propels the vehicle;
    determining a change in the motor rotor shaft position from a first time to a second time; and
    determining the distance travelled by the vehicle by a set ratio of the change in the electric motor position to the distance travelled, wherein determining the distance travelled further comprises determining a drive train torque, and adjusting the distance travelled with a gear lash distance when the drive train torque crosses a zero value.

12. The method of claim 11 further comprising:
    determining a drive train twist distance based on the drive train torque; and
    adjusting the distance travelled with the drive train twist distance.

13. The method of claim 11 wherein;
    determining the distance travelled comprises determining a number of rotations of the drive wheel.

14. The method of claim 13 further comprising:
    determining a radius of the drive wheel.

* * * * *